(12) United States Patent
Holland et al.

(10) Patent No.: US 7,584,325 B2
(45) Date of Patent: Sep. 1, 2009

(54) APPARATUS, SYSTEM, AND METHOD FOR PROVIDING A RAID STORAGE SYSTEM IN A PROCESSOR BLADE ENCLOSURE

(75) Inventors: William Gavin Holland, Cary, NC (US); Shah Mohammed Rezaul Islam, Tucson, AZ (US); Carl Evan Jones, Tucson, AZ (US); Robert Akira Kubo, Tucson, AZ (US); Gregg Steven Lucas, Tucson, AZ (US); Andrew Boyce McNeill, Jr., Cary, NC (US); Kenneth Robert Schneebeli, San Jose, CA (US); Theodore Brian Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 11/460,150

(22) Filed: Jul. 26, 2006

(65) Prior Publication Data

US 2008/0126696 A1    May 29, 2008

(51) Int. Cl.
*G06F 12/00* (2006.01)
(52) U.S. Cl. .................. 711/114; 711/115; 711/154; 711/170
(58) Field of Classification Search .................. None
See application file for complete search history.

(56) References Cited

U.S. PATENT DOCUMENTS

| | | | | |
|---|---|---|---|---|
| 6,618,821 | B1 | 9/2003 | Duncan et al. ............... 714/14 |
| 6,980,427 | B2 | 12/2005 | Garnett et al. ............. 361/685 |
| 7,093,069 | B2 * | 8/2006 | Chong, Jr. .................. 711/114 |
| 7,249,277 | B2 * | 7/2007 | Arai et al. ....................... 714/6 |
| 7,334,064 | B2 * | 2/2008 | Davies et al. ................ 710/62 |
| 7,356,638 | B2 * | 4/2008 | Holland et al. ............. 710/316 |
| 2002/0194412 | A1 * | 12/2002 | Bottom ...................... 710/302 |
| 2003/0210522 | A1 * | 11/2003 | Rietze et al. ................ 361/685 |
| 2004/0064638 | A1 * | 4/2004 | Chong, Jr. .................. 711/114 |
| 2004/0199568 | A1 | 10/2004 | Lund .......................... 709/201 |
| 2004/0199699 | A1 | 10/2004 | Bobbitt et al. ............. 710/305 |
| 2005/0076107 | A1 | 4/2005 | Goud et al. ................. 709/223 |
| 2005/0138439 | A1 | 6/2005 | Rothman et al. ............ 713/300 |
| 2006/0265449 | A1 * | 11/2006 | Uemura et al. ............. 709/203 |
| 2007/0094531 | A1 * | 4/2007 | Ni et al. .......................... 714/4 |
| 2007/0101059 | A1 * | 5/2007 | Kobayashi et al. .......... 711/114 |
| 2007/0226415 | A1 * | 9/2007 | Holland et al. ............. 711/114 |
| 2007/0276997 | A1 * | 11/2007 | Luning et al. ............... 711/114 |
| 2008/0034067 | A1 * | 2/2008 | Islam et al. ................. 709/220 |

OTHER PUBLICATIONS

Googles cache of http://www.rackservers.com/blade3a.asp as retrieved on Jul. 17, 2005 05:29:34 GMT. http://www.google.com/search?q=cache:f_7zWclvx94J:www.rackservers.com/blade3a.asp+%22server+blade%22+%22embedded+RAID%22&hl=en&clinet=firefox-a.

* cited by examiner

*Primary Examiner*—Jack A Lane
(74) *Attorney, Agent, or Firm*—Kunzler & McKenzie

(57) ABSTRACT

An apparatus, system, and method are disclosed for providing a redundant array of inexpensive disks ("RAID") storage subsystem within a processor blade enclosure. A first RAID controller blade is included and configured to fit in a processor blade enclosure. At least one processor in communication with the first RAID controller blade is included. A disk enclosure blade is provided that includes a plurality of hard disk drives. The disk enclosure blade is configured to fit in the processor blade enclosure and the hard disk drives are in communication with the first RAID controller blade.

30 Claims, 7 Drawing Sheets

# APPARATUS, SYSTEM, AND METHOD FOR PROVIDING A RAID STORAGE SYSTEM IN A PROCESSOR BLADE ENCLOSURE

BACKGROUND OF THE INVENTION

1. Field of the Invention

This invention relates to processor blade enclosures and more particularly relates to a RAID storage subsystem in a processor blade enclosure.

2. Description of the Related Art

Typical servers, switches, hard disk drives, and related equipment have traditionally been rack mounted for convenience and conservation of space. Rack mounted equipment has the disadvantage of being connected with cables. Cables are a reliability problem because they can be bumped or loosen over time and be inadvertently disconnected. Rack mounted equipment is also large and bulky with a lot of wasted space between and around rack mounted equipment.

As a solution, processor blades have been developed to provide a server in a compact package. Processor blades can be integrated into a processor blade enclosure such as a BladeCenter® from International Business Machines ("IBM®") or an HP BladeSystem® from the Hewlett-Packard Company®. Processor blade enclosures provide a compact structure to house processor blades. Typical processor blade enclosures include space for several processor blades. Processor blade enclosures also typically include Ethernet switches, fiber channel switches, management modules, communication fabric, power supplies, and batteries. Processor blade enclosures may also include expanders such as a serial attached SCSI ("SAS") expander. (SCSI is an acronym for small computer system interface.) Expanders allow connection to storage devices in a star configuration. Storage devices can also be connected in a daisy chain configuration.

Processor blade enclosures typically do not include storage devices other than small hard disk drives configured to store code necessary for booting up the processor blade. Processor blades typically contain two small form factor drives that are very limited in size and usefulness. A processor blade enclosure with twelve processor blades may include 24 of hard disk drives in the processor blades but typically would not use the hard disk drives for general data storage. The hard disk drives also take up valuable space in the processor blades.

For a small office solution, space is at a premium and a typical processor blade enclosure would have to be accompanied by storage devices in a rack or other mounting. This arrangement is inconvenient because of the space required and also because the system has reliability issues due to the required cabling from hard disk drives to a processor blade enclosure. Reliability may be increased using a redundant array of inexpensive disks ("RAID"). Typically the RAID storage subsystem is accomplished outside of the processor blade enclosure.

From the foregoing discussion, it should be apparent that a need exists for an apparatus, system, and method to provide a RAID storage subsystem within a processor blade enclosure. Beneficially, such an apparatus, system, and method would provide a dense data storage solution within a processor blade enclosure that is reliable and efficient.

SUMMARY OF THE INVENTION

The present invention has been developed in response to the present state of the art, and in particular, in response to the problems and needs in the art that have not yet been fully solved by currently available processor blade enclosures. Accordingly, the present invention has been developed to provide an apparatus, system, and method to provide a RAID storage subsystem within a processor blade enclosure that overcome many or all of the above-discussed shortcomings in the art.

The apparatus to provide a RAID storage subsystem within a processor blade enclosure is provided with a plurality of modules and components configured to functionally execute the necessary steps of storing data in a RAID array located in a processor blade enclosure. These modules and components in the described embodiments include a first RAID controller blade that fits in a processor blade enclosure. The apparatus includes at least one processor blade in communication with the first RAID controller blade through a communication fabric in the processor blade enclosure. The apparatus contains a disk enclosure blade that includes a plurality of hard disk drives. The disk enclosure blade is configured to fit in the processor blade enclosure and the hard disk drives are in communication with the first RAID controller blade. In one embodiment, the at least one processor is a processor blade and communicates with the first RAID controller through a communication fabric in the processor blade enclosure.

The apparatus, in one embodiment, is configured to include a serial attached SCSI ("SAS") expander where the hard disk drives communicate with the first RAID controller blade through the SAS expander. In another embodiment, the SAS expander is located in a second processor blade enclosure. In yet another embodiment, the SAS expander communicates with the first RAID controller blade and the hard disk drives through a communication fabric in the processor blade enclosure and the second processor blade enclosure. In one embodiment, the first RAID controller blade and the hard disk drives are connected in a daisy chain configuration.

The apparatus is further configured, in one embodiment, to include a second RAID controller blade that fits in the processor blade enclosure and is in communication with the at least one processor and with the hard disk drives. In another embodiment, the second RAID controller blade is redundant to the first RAID controller blade.

In a further embodiment, the disk enclosure blade comprises up to eight trays containing hard disk drives. In another embodiment, each tray comprises up to three hard disk drives. In yet another embodiment, the hard disk drives are small form factors hard disk drives. The processor blade enclosure, in one embodiment, includes additional slots for processor blades. In another embodiment, the RAID controller blade and hard disk drives are configurable for different RAID levels.

An alternate apparatus is included to provide a RAID storage subsystem within a processor blade enclosure and is provided with a plurality of modules and components configured to functionally execute the necessary steps of storing data in a RAID array located in a processor blade enclosure. These modules and components in the described embodiments include a data command module that communicates a data storage command from a client to a processor blade located in a processor blade enclosure. A data storage module transmits data related to the data storage command to a first RAID controller blade. The first RAID controller blade fits in the processor blade enclosure and communicates with the processor blade through a communication fabric in the processor blade enclosure. A RAID module stores the data on a plurality of hard disk drives in a RAID configuration. The plurality of hard disk drives communicate with the first RAID controller blade and are located in a disk enclosure blade that is configured to fit in the processor blade enclosure.

In one embodiment, the first RAID controller blade comprises a processor blade. In another embodiment, the apparatus further comprises an SAS expander and the hard disk drives communicate with the first RAID controller blade through the SAS expander.

A system of the present invention is also presented to provide a RAID storage subsystem within a processor blade enclosure. The system may be embodied by a processor blade enclosure. In particular, the system, in one embodiment, includes at least one processor blade in the processor blade enclosure. The system includes a client in communication with the at least one processor blade through a computer network. The system includes a first RAID controller blade that fits in the processor blade enclosure and is in communication with the at least one processor blade through a communication fabric in the processor blade enclosure. The system includes a disk enclosure blade that contains a plurality of hard disk drives. The disk enclosure blade is configured to fit in the processor blade enclosure and the hard disk drives are in communication with the first RAID controller blade.

The system may further include an SAS expander where the hard disk drives communicate with the first RAID controller blade through the SAS expander. In another embodiment, the system includes a second RAID controller blade that fits in the processor blade enclosure and is in communication with the at least one processor blade and with the hard disk drives. In another, the first RAID controller blade and the hard disk drives are connected in a daisy chain configuration. In yet another embodiment, the RAID controller blade and hard disk drives are configurable for different RAID levels.

A method of the present invention is also presented to provide communication between a client and a RAID storage subsystem within a processor blade enclosure. The method in the disclosed embodiments substantially includes the steps necessary to carry out the functions presented above with respect to the operation of the described apparatus and system. In one embodiment, the method includes communicating a data storage command from a client to a processor blade located in a processor blade enclosure through a computer network. The method includes transmitting data related to the data storage command to a first RAID controller blade that fits in the processor blade enclosure and communicates with the processor blade through a communication fabric in the processor blade enclosure. The method also includes storing the data as directed by the first RAID controller blade on a plurality of hard disk drives in a RAID configuration. The plurality of hard disk drives is located in a disk enclosure blade configured to fit in the processor blade enclosure.

In one embodiment, a SAS expander is included and the hard disk drives communicate with the first RAID controller blade through the SAS expander. In another embodiment, a second RAID controller blade is included to fit in the processor blade enclosure and in communication with the at least one processor blade and with the hard disk drives. The method may include configuring the hard disk drives for a particular RAID level.

Another method of the present invention is also presented for configuring a RAID storage subsystem within a processor blade enclosure. The method in the disclosed embodiments substantially includes the steps necessary to carry out the functions presented above with respect to the operation of the described apparatus and system. In one embodiment, the method includes establishing communication between a first RAID controller blade configured to fit in a processor blade enclosure and at least one processor blade through a communication fabric in the processor blade enclosure. The method includes configuring a plurality of hard disk drives in a disk enclosure blade for a RAID level. The disk enclosure blade is configured to fit in the processor blade enclosure. The method also includes configuring the first RAID controller blade to control the hard disk drives in the disk enclosure blade.

In one embodiment, the method includes establishing communication between the at least one processor blade and a client through a computer network. In another embodiment, the method includes configuring a second RAID controller blade that fits in the processor blade enclosure as a redundant RAID controller blade.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
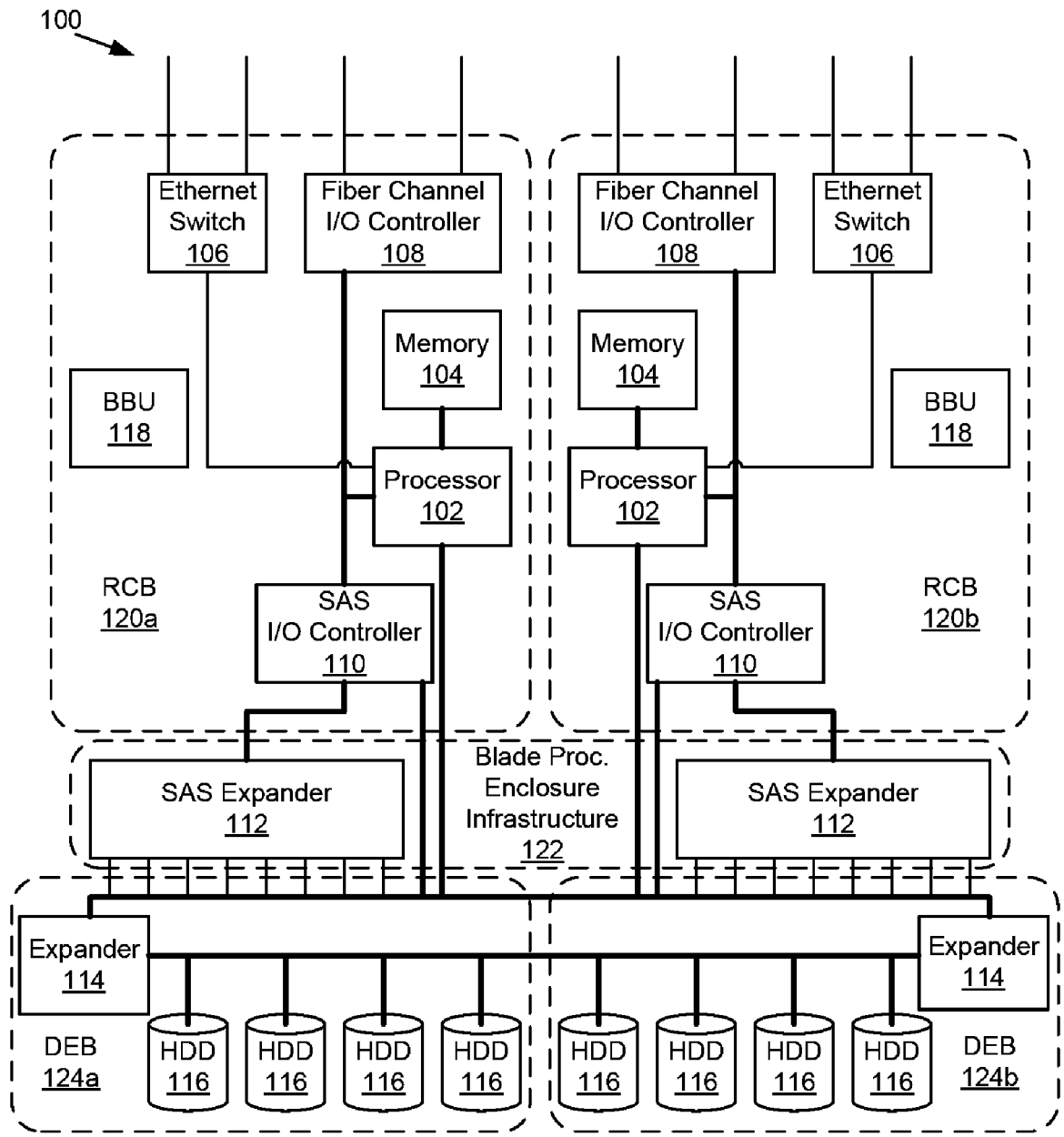
FIG. 1 depicts a schematic block diagram illustrating one embodiment of a typical non-integrated RAID storage subsystem including mapping of the components into a processor blade enclosure in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams described herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a schematic block diagram illustrating one embodiment of a typical non-integrated RAID storage subsystem 100 including mapping of the components into a processor blade enclosure in accordance with the present invention. The RAID storage subsystem 100 depicted is a conceptual diagram to show how a RAID storage subsystem 100 with redundant RAID controllers and storage components may be mapped to blades in a processor blade enclosure. A blade comprises a structure designed to plug into a processor blade enclosure and to mate to communication fabric and power buses in the processor blade enclosure. A communication fabric may include traces on a printed circuit board, copper busing, wiring that is secured in place, cables, or other channels for data to flow. Communication fabric may include transmission of commands, data, control instructions, and the like. One of skill in the art will recognize other communication fabric capable of transmitting data in a processor blade enclosure. A blade may comprise a processor blade, a management blade, or other components configured in a physical form to fit in a processor blade enclosure. A blade is typically designed to occupy one or more slots in a processor blade enclosure.

A RAID controller may contain many components common with a processor blade. A processor blade is a compact computer that plugs into a processor blade enclosure. A processor blade typically connects to clients over a computer network such as a local area network ("LAN"). The processor blades in a processor blade enclosure are typically connected to storage devices over a fiber channel SAN fabric or other suitable storage fabric.

A processor blade enclosure typically includes internal components and communication fabric configured in a compact form. Processor blades and other components typically plug into communication fabric of the processor blade enclosure to avoid internal cabling. A processor blade enclosure may also include power supplies, switches, management modules, and other management functions configured to manage the processor blades, power supplies, and communication.

A RAID controller may include a processor 102 and a memory 104. The RAID controller may communicate over an Ethernet connection through an Ethernet switch 106 or over a fiber channel connection through a fiber channel I/O controller 108. A RAID controller in the RAID storage subsystem 100 may include a serial attached SCSI ("SAS") I/O controller 110 that connects to storage devices. The SAS I/O controller 110 may connect to the storage devices through a SAS expander 112 or may be daisy chained to storage devices.

The RAID storage subsystem 100 may include an expander 114 in communication with hard disk drives ("HDD") 116. One connection from a RAID controller to the hard disk drives 116 may be through the SAS expander 112. In this configuration, SAS I/O controller 110 is connected to the SAS expander 112 which connects to each hard disk drive 116. In another example, the SAS I/O controller 110 connects to the expander 114 in communication with each hard disk drive 116. This connection may be a daisy chain connection from expander 114 to expander 114 to another enclosure.

A RAID controller may also include a battery backup unit ("BBU") 118. A BBU 118 typically includes a battery and related monitoring and charging circuitry. The BBU 118 is intended to provide enough power to the RAID controller when primary power is interrupted to allow the RAID controller to save critical data, execute commands, etc. for a graceful shutdown of the RAID controller without losing important data.

The processor 102, memory 104, Ethernet switch 106, fiber channel I/O controller 108, SAS I/O controller 110, and battery 118 may be grouped together to form a RAID controller blade ("RCB") 120. In a configuration where SAS expanders 112 are included in the RAID storage subsystem 100, the SAS expanders 112 may be located in the processor blade enclosure infrastructure 122. The hard disk drives 116 and associated expanders 114 may be mapped to one or more disk enclosure blades ("DEB") 124.

In other embodiments, components of a RAID storage subsystem 100 may be mapped differently. For example, an RCB 120 may include an SAS expander 112. A processor blade may include components of an RCB 120 or may function as an RCB. A DEB 124 may not include an expander 114. One of skill in the art will recognize other mappings of components into blades to form a RAID storage subsystem 100 in a processor blade enclosure.

Figure 2:
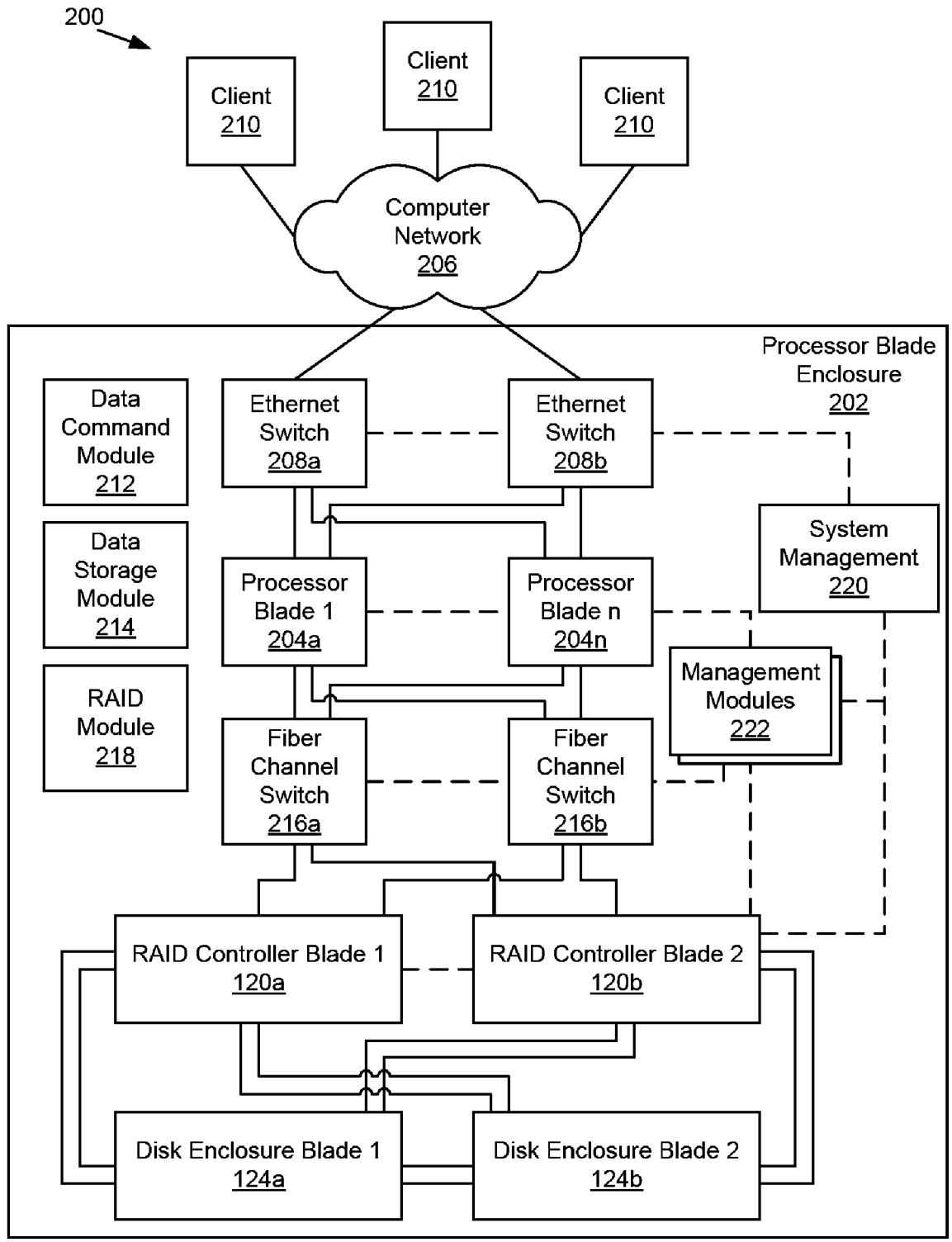
FIG. 2 depicts a schematic block diagram illustrating one embodiment of a system to provide a RAID storage subsystem within a processor blade enclosure in accordance with the present invention.

FIG. 2 depicts a schematic block diagram illustrating one embodiment of a system 200 to provide a RAID storage subsystem 100 within a processor blade enclosure 202 in accordance with the present invention. The system 200 includes n processor blades 204 connected to a computer network 206 through Ethernet switches 208. A typical processor blade enclosure 202 includes two Ethernet switches 208a, 208b and up to 14 processor blades (204a to 204n). Other communication protocols may also be used such as fiber channel, Internet SCSI ("iSCSI"), and the like and a processor blade enclosure 202 may communicate using more than one communication protocol. Other processor blade enclosures 202 may also include more or less processor blades 204. One of skill in the art will recognize other communication protocols appropriate for a processor blade enclosure 202.

The processor blades 204 communicate with clients 210 through the computer network 206. A data command module 212 may be included to communicate a data storage command from a client 210 to a processor blade 204 located in a processor blade enclosure 202. For example, the data storage command may be a command to store data, retrieve data, backup data, or a similar command. One of skill in the art will recognize data storage commands appropriate for communication between a processor blade 204 and a client 210.

A data storage module 214 may be included to transmit data related to the data storage command to a RAID controller blade 120. The processor blades 204 communicate with a RAID controller blade 120 typically through a fiber channel switch 216. Typically, a processor blade enclosure 202 includes two fiber channel switches 216a, 216b, although more or less fiber channel switches may be included. Other communication protocols may also be used for communication between a processor blade 204 and a RAID controller blade 120. For example, a processor blade 204 and a RAID controller blade 120 may communicate using Ethernet, SCSI, Fiber Connectivity ("FICON"), Enterprise Systems Connection ("ESCON"), or the like. One of skill in the art will recognize other communication protocols appropriate for communication between a processor blade 204 and a RAID controller blade 120. In a BladeCenter embodiment, a BladeCenter typically includes two Ethernet switches 208a, 208b and two fiber channel switches 216a, 216b.

In a preferred embodiment, the processor blade enclosure 202 includes two RAID controller blades ("RCB") 120a, 120b. A second RCB 120b may be included for redundancy. An RCB 120 is preferably in the form of a blade and may include a processor 102, memory 104, etc. as described in relation to FIG. 1. Preferably, an RCB 120 occupies one slot of the processor blade enclosure 202. An RCB 120 is configured to control an array of hard disk drives 116 for a specified RAID level. Preferably an RCB 120 supports different RAID levels and the RCBs 120 and connected hard disk drives 116 may be configured to conform to a selected RAID level. In an alternate embodiment, a processor blade 204 functions as an RCB 120. In another embodiment, an RCB 120 is integrated into the processor blade enclosure 202. In yet another embodiment, a management blade functions as an RCB 120. One of skill in the art will recognize other forms of an RCB 120 that may be located in a processor blade enclosure 202.

A RAID module 218 may be included to store the data related to the data storage command on a plurality of hard disk drives 116 in a RAID configuration. The plurality of hard disk drives 116 are in communication with a RAID controller blade 120 and are located in a disk enclosure blade ("DEB") 124 configured to fit in the processor blade enclosure 202. A DEB 124 may also include one or more expanders 114 configured to communicate with each hard disk drive 116. In a preferred embodiment, a DEB 124 includes up to eight trays of hard disk drives 116. Each tray may include up to three hard disk drives 116. The hard disk drives 116 are preferably small form factors drives. In another embodiment, a DEB 124 includes more than eight trays of hard disk drives 116. In another embodiment, a DEB 124 includes hard disk drives 116 not stored in trays. In another embodiment, a DEB 124 includes trays with more than three hard disk drives 116. One of skill in the art will recognize other configurations of hard disk drives 116 in a disk enclosure blade 124 capable of fitting in a processor blade enclosure 202 and configurable in a RAID storage subsystem 100.

The data command module 212, data storage module 214, and RAID module 218 may be located in the management modules 222, system management 220, RCBs 204, processor blades 204, or any other location in the processor blade enclosure 202 or other device or computer controlling data in a processor blade enclosure 202. The data command module 212, data storage module 214, and RAID module 218 may be together or in separate devices and the functions associated with the modules may also be together or in separate devices. One of skill the art will recognize other locations where all or part of the described modules may reside.

The system 200 may also include system management 220 and one or more management modules 222 configured to control the components of the processor blade enclosure 202. The system management 220, for example may allow user access to the processor blade enclosure 202 components, may monitor temperature, power, etc. The management modules 222 may allow control of the processor blades 204 and may direct communication. One of skill in the art will recognize other management functions that may be performed by the system management 220 and the management modules 222.

In one embodiment, the RCBs 120 are connected to the DEBs 124 using cables and the DEBs 124 may be daisy chained together as depicted in FIG. 2. Further details of cabling between RCBs 120 and DEBs 124 will be described in relation to FIG. 4. If the processor blade enclosure 202 is a BladeCenter, connecting the RCBs 120 to the DEBs 124 using cables is a preferred embodiment. A typical Blade-Center includes two Ethernet switches 208a, 208b and two fiber channel switches 216a, 216b in the BladeCenter infrastructure, but typically would not have space for SAS expanders 112 in the infrastructure 122. In this situation, one embodiment includes cabling from the RCBs 120 to the DEBs 124. If more than one DEB 124a is included, the second DEB 124b may be connected using a daisy chain connection. A third or fourth DEB 124 may also be included and daisy chained to the other DEBs 124a, 124b.

An advantage of a RAID storage subsystem 100 in a processor blade enclosure 202 is that processor blades 204 may be constructed without internal hard disk drives to store code to boot up the processor blades 204. The processor blades 204 may be booted from code stored in the RAID storage subsystem 100. The advantage of no hard disk drives in processor blades 204 may allow smaller processor blades 104, more memory in the processor blades 204, other components to be placed in the processor blades 204, etc. One of skill in the art will recognize other advantages processor blades 204 with no internal hard disk drives.

Figure 3:
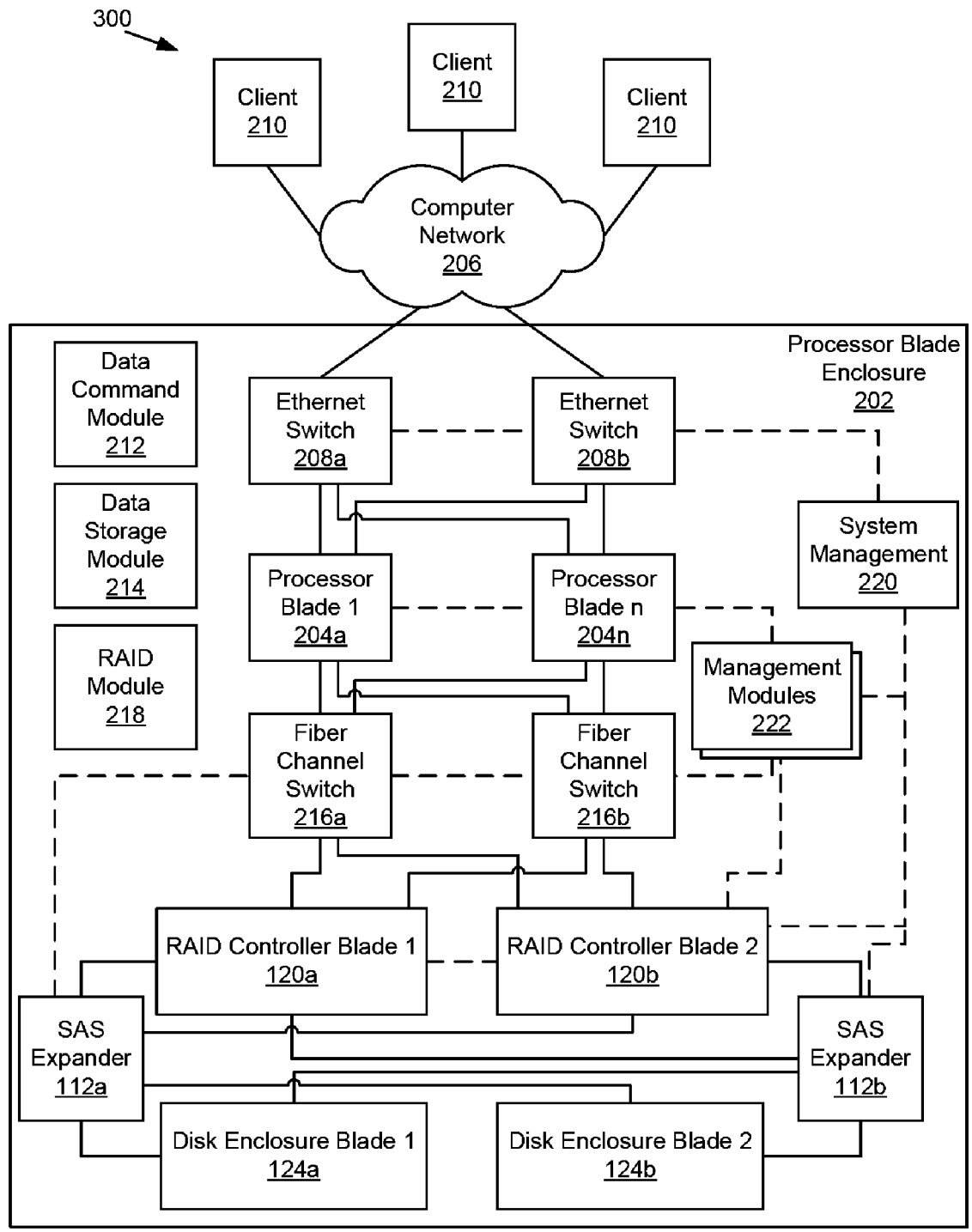
FIG. 3 depicts a schematic block diagram illustrating an alternate embodiment of a system to provide a RAID storage subsystem within a processor blade enclosure in accordance with the present invention.

FIG. 3 depicts a schematic block diagram illustrating an alternate embodiment of a system 300 to provide a RAID storage subsystem 100 within a processor blade enclosure 202 in accordance with the present invention. The system 300 includes a processor blade enclosure 202 with processor blades 204, Ethernet switches 208, a data command module 212, a data storage module 214, fiber channel switches 216, a RAID module 218, RCBs 120, DEBs 124, system management 220, and management modules 222 substantially as described in relation to FIG. 2. In addition, the system 300 includes clients 210 connected to the processor blades 204 through Ethernet switches 208 and a computer network 206 substantially as described in FIG. 2.

The system 300 also includes SAS expanders 112 connecting the RCBs 120 to the DEBs 124. In one embodiment, the processor blade enclosure 202 comprises a BladeCenter solution with two BladeCenters. In this embodiment, the SAS expanders 112a, 112b fit in the second BladeCenter and allow connection of the RCBs 120 to the DEBs 124 through the SAS expanders 112 by way of communication fabric in the processor blade enclosure infrastructure 122. The SAS expanders 112 may be connected to the hard disk drives 116 in a star configuration. The connection of the SAS expanders 112 to the hard disk drives will be explained further in relation to FIG. 5.

In another embodiment, the SAS expanders 112 are included in a single processor blade enclosure 202. In yet another embodiment, the SAS expanders 112 are connected to the RCBs 120 and DEBs 124 with cabling. Another example includes SAS expanders 112 in the form of a blade. One of skill in the art will recognize other processor blade enclosures 202 with SAS expanders 112 to connect RCBs 120 to hard disk drives 116 in DEBs 124.

Figure 4:
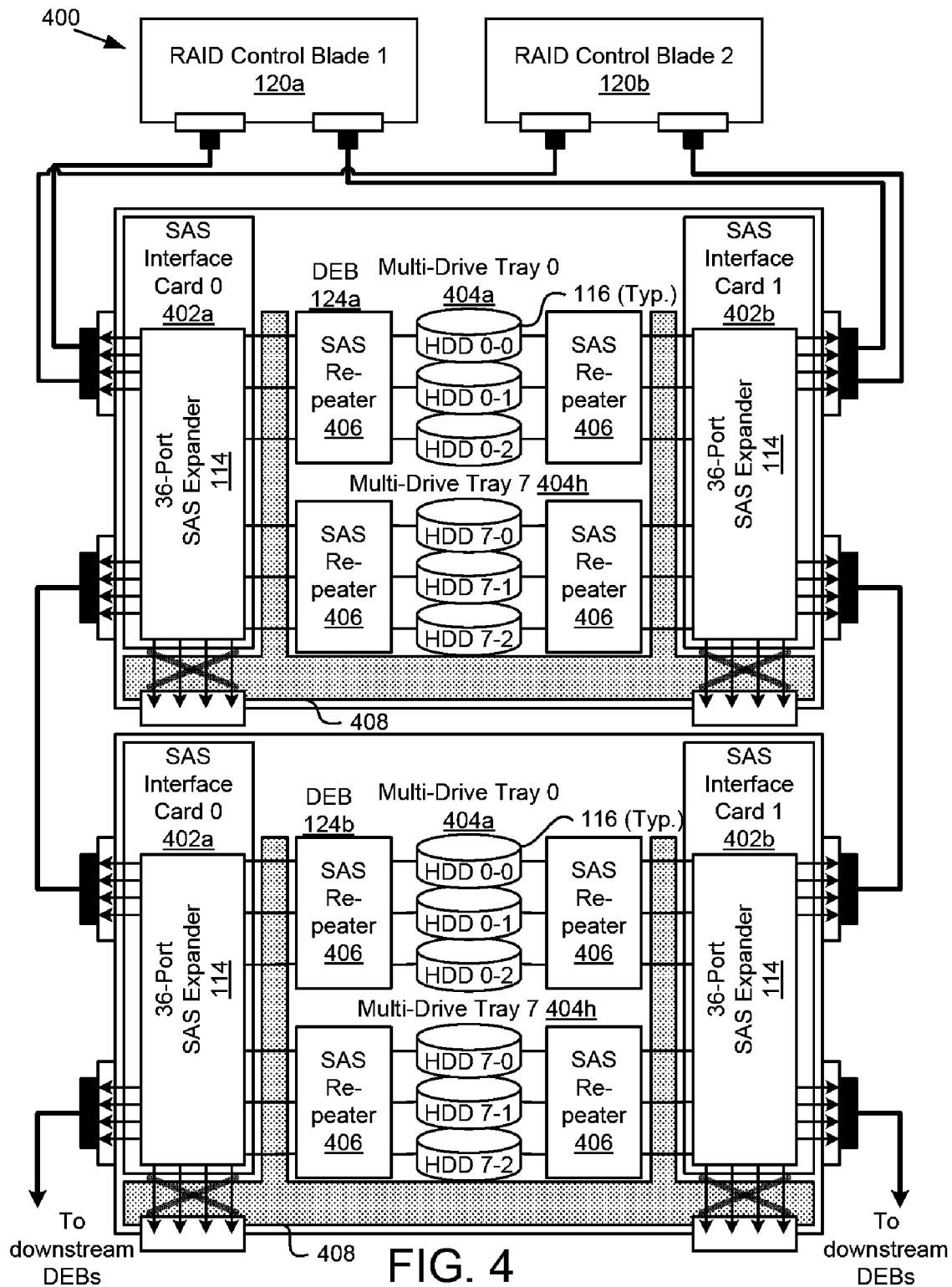
FIG. 4 depicts a schematic block diagram illustrating a particular embodiment of an apparatus to provide a RAID storage subsystem within a processor blade enclosure in accordance with the present invention.

FIG. 4 depicts a schematic block diagram illustrating a particular embodiment of an apparatus 400 to provide a RAID storage subsystem 100 within a processor blade enclosure 202 in accordance with the present invention. The apparatus 400 may be used for a single BladeCenter solution, but one of skill in the art will recognize other applications for the apparatus 400. The apparatus 400 includes two RCBs 120a, 120b and two DEBs 124a, 124b connected in a daisy chain configuration. The DEBs 124 include a connection suitable for a star configuration, shown at the bottom of each 36-port SAS expander 114 in each DEB 124, but the connections are disabled in this apparatus 400, which is indicated by an "X" through the connections.

Each DEB 124 includes two expanders 114, as described in relation to FIG. 1, which are identified in FIG. 4 as 36-port SAS expanders 114. In one embodiment, the expanders 114 are included in a SAS Interface Card (SIC) 402. In a DEB, the SAS Interface Cards 402 are located at the top and the bottom of the blade. Each DEB 124 also includes up to eight trays with hard disk drives 116. Each tray is stacked vertically and is called a Multi-Disk Tray (MDT) 404. Each Multi-Disk Tray includes up to three small form factor hard disk drives 116. The hard disk drives 116 may be assigned addresses. For example, the hard disk drives 116 in a first Multi-Disk Tray 404a may be numbered 0-0, 0-1, and 0-2, the hard disk drives 116 in a second Multi-Disk Tray 404b may be numbered 1-0, 1-1, and 1-2, etc. The hard disk drives 116 communicate with the 36-port SAS expanders 114 through an SAS repeater 406. SAS expanders 114 may communicate through a daisy chain connection as shown in FIG. 4. A processor blade enclosure 202 may include multiple DEBs 124. Where more than one processor blade enclosure 202 are included, the processor blade enclosures 202 may include DEBs 124 in each processor blade enclosure 202 controlled by one or more RCBs 120. The DEBs 124 may also include other circuitry 408 for management of the DEB such as temperature monitoring, error detection, and the like.

Figure 5:
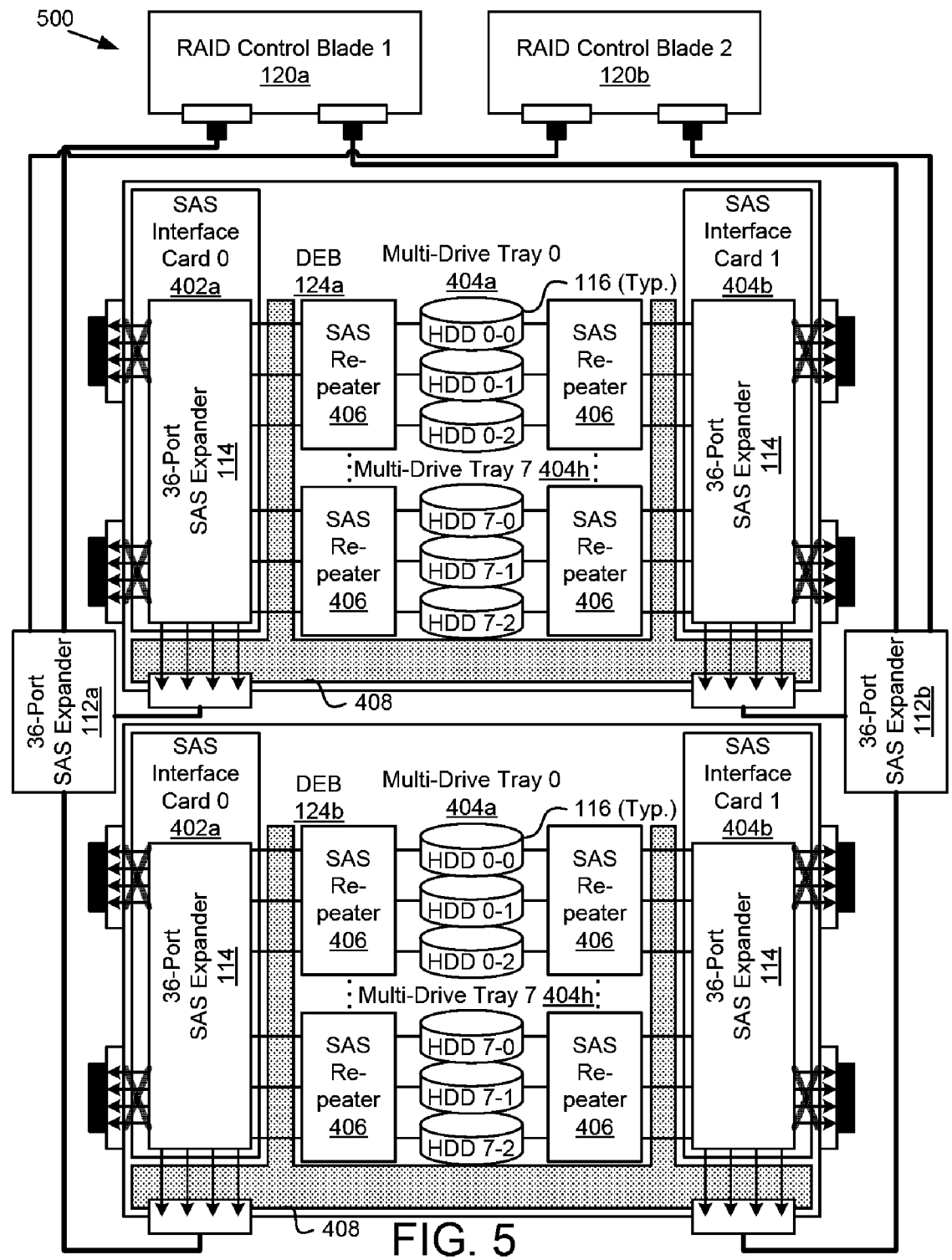
FIG. 5 depicts a schematic block diagram illustrating an alternate embodiment of an apparatus to provide a RAID storage subsystem within a processor blade enclosure in accordance with the present invention.

FIG. 5 depicts a schematic block diagram illustrating an alternate embodiment of an apparatus 500 to provide a RAID storage subsystem 100 within a processor blade enclosure 202 in accordance with the present invention. The apparatus 500 may be used for a RAID storage subsystem 100 with two BladeCenters. The apparatus 500 includes RCBs 120 and DEBs 124 as described in relation to the apparatus 400 of FIG. 4, but also includes SAS expanders 112 in addition to SAS expanders 114 in the DEBs 124. The additional SAS expanders 112 are described as 36-port SAS Expanders 112 in FIG. 5. The DEBs 124 include 36-port SAS expanders 114 in SAS Interface Cards 402, Multi-Disk Tray 404 with SAS repeaters 406 and hard disk drives 116, and associated management circuitry 408 substantially similar to the DEBs 124 described in relation to FIG. 4.

The SAS expanders 112 shown to the sides of the DEBs 124 typically would be included in the infrastructure 122 of a second BladeCenter for a BladeCenter solution. In another embodiment, the SAS expanders 112 may also be located in a single processor blade enclosure 202. In the apparatus 500, the RCBs 120 and DEBs 124 are connected to the SAS expander 112 though communication fabric in the infrastructure 122 of the processor blade enclosures 202. The ports in the DEBs 124 used for a daisy chain connection, pictured to the sides of the SAS expanders 114 in the DEBs 124, are disabled in the apparatus 500 which is indicated by an "X" through the connections.

Using an SAS expander 112 to connect the DEBs 124 to the RCBs 120 provides a connection to the hard disk drives 116 so that a Multi-Disk Tray 404 or DEB 124 may be removed without losing access to the other Multi-Disk Trays 404 and DEBs 124. The apparatus 500 provides a more reliable connection to the hard disk drives 116 because the hard disk drives 116 are connected through a communication fabric in the processor blade enclosure infrastructure 122 and because the SAS expanders 112 external to the DEBs 124 allow removal of DEBs 124 or Multi-Disk Tray 404 without interrupting connection to the hard disk drives 116 not being removed. The apparatus 500 also provides greater fault tolerance over an apparatus 400 with a daisy chained connection to the hard disk drives 116.

Figure 6:
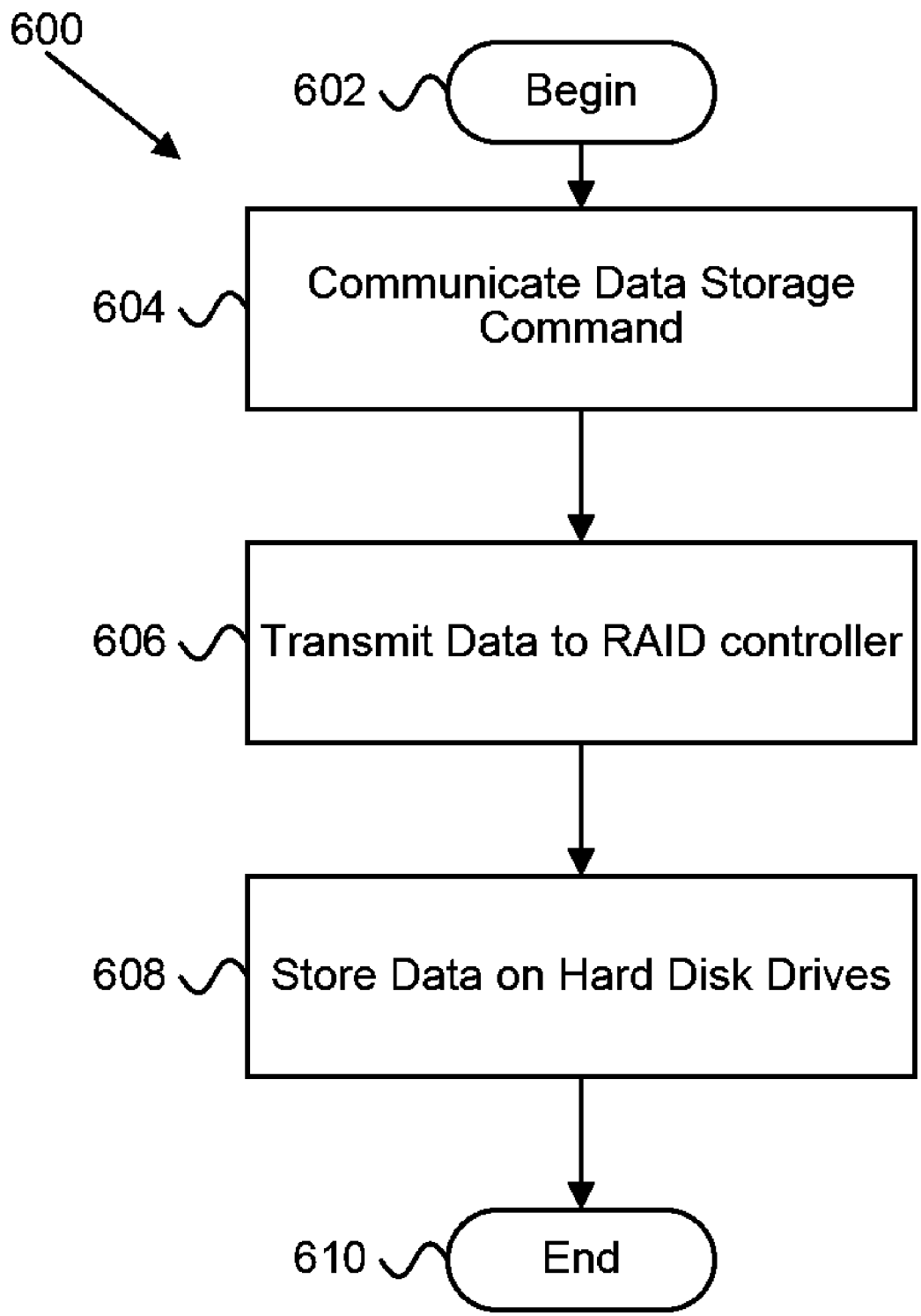
FIG. 6 depicts a schematic flow chart diagram illustrating one embodiment of a method to provide communication between a client and a RAID storage subsystem within a processor blade enclosure in accordance with the present invention.

FIG. 6 depicts a schematic flow chart diagram illustrating one embodiment of a method 600 to provide communication between a client and a RAID storage subsystem 100 within a processor blade enclosure 202 in accordance with the present invention. The method 600 begins 602 and the data command module 212 communicates 604 a data storage command from a client 210 to a processor blade 204 located in a processor blade enclosure 202. The data storage module 214 transmits 606 data related to the data storage command to a first RAID controller blade 120*a*. The first RAID controller blade 120*a* fits in the processor blade enclosure 202 and communicates with the processor blade 204 through a communication fabric in the processor blade enclosure 202. The first RAID controller blade 120*a* may also communicate with the processor blade 204 through cabling, direct connection, or other means. The RAID module 218 stores 608 the data on a plurality of hard disk drives 116 in a RAID configuration and the method 600 ends 610. The plurality of hard disk drives 116 are in communication with the first RAID controller blade 120*a* and are located in a disk enclosure blade 124*a*. The disk enclosure blade 124*a* is configured to fit in the processor blade enclosure 202.

Figure 7:
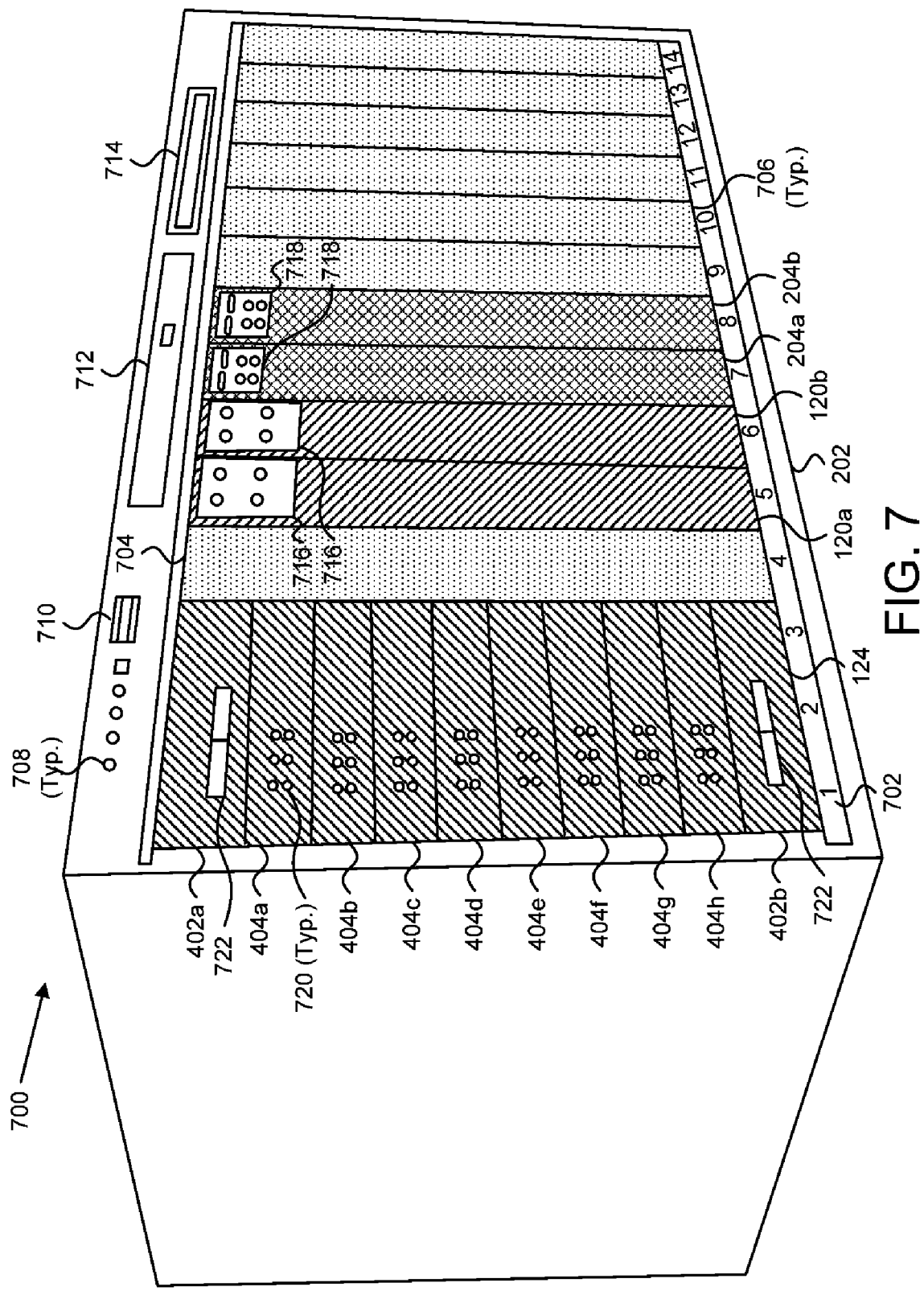
FIG. 7 depicts a perspective view of a RAID storage subsystem within a processor blade enclosure in accordance with the present invention.

FIG. 7 depicts a perspective view 700 of a RAID storage subsystem 100 within a processor blade enclosure 202 in accordance with the present invention. Note that the processor blade enclosure 202 shown is not to scale but is intended to demonstrate possible physical relationships between blade components. The RAID storage subsystem 100 includes a typical processor blade enclosure 202 similar to an IBM BladeCenter. The processor blade enclosure 202 includes, in one embodiment, 14 slots 702. The first three slots 702 are occupied by a DEB 124. The fourth slot 702 is filled with a spacer 704, the fifth and sixth slots 702 contain two RCBs 120*a*, 120*b*. The seventh and eighth slots 702 are filled with processor blades 204*a*, 204*b*. The ninth to the fourteenth slots 702 are filled with spacers 706. The empty slots 702 may be filled with processor blades 204, RCBs 120, DEBs 124, management blades, or the like. The processor blade enclosure 202 typically is rack mounted but may also be a standalone device. Rack mounting hardware is not shown.

The blades fit in the processor blade enclosure 202 by sliding into the slots. The blades typically connect to power buses and communication fabric. The communication fabric may be used for data, management, monitoring or other suitable purpose. The blades may also be connected to other devices or other blades by cabling.

The processor blade enclosure 202 may also include indicator lights and buttons 708 or one or more universal serial bus ("USB") connections 710. The processor blade enclosure 202 may also include other connections such as a serial port, parallel port, FireWire®, wireless connection, etc. The processor blade enclosure 202 may also include devices for removable storage media such as a compact disk ("CD") drive 712 or a Zip® drive 714. The processor blade enclosure 202 may also include other removable storage media such as tape drives, optical drives, floppy drives, etc. The processor blade enclosure 202 may also include other user interface and management controls, indicators, and equipment. One of skill in the art will recognize other controls, indicators, connections, removable storage medial, and equipment suitable for a processor blade enclosure 202 with a RAID storage subsystem 100.

An RCB 120 may include controls and indicator lights 716 as well as other connection points, interfaces, etc. A processor blade 204 also typically includes controls and indicator lights 718 and the like. A spacer 704 between an RCB 120*a* and a DEB 124 may be desirable, in one embodiment, for heat removal, wiring, etc. In another embodiment, the RCBs 120 are next to DEBs 124.

A DEB 124 may include SAS expanders 114 and Multi-Disk Trays 404*a*-404*h*. The Multi-Disk Trays 404*a*-404*h* may include indicator lights 720 or the like. The DEB 124 may include SAS Interface Cards 402*a*, 402*b* and may include external SAS ports 722 to provide external connectivity and expansion for SAS expanders 114. The SAS Interface Cards 402 and Multi-Disk Trays 404 may be removed and may include handles (not shown) to facilitate removal. The RCBs 120 and processor blades 204 may also include handles (not shown) for removal.

Processor blade enclosures 202 are advantageous because of their compact size and reliability. Adding a RAID storage subsystem 100 to a processor blade enclosure 202 provides a convenient system-in-a-box solution for small businesses or others that may desire a system with blades to fill one or two processor blade enclosures 202. A RAID storage subsystem 100 in a processor blade enclosure 202 may also be desirable for larger computer systems where users want to conserve space or have a reliable RAID storage subsystem 100 with few cables.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to provide a redundant array of independent disks ("RAID") storage subsystem within a processor blade enclosure, the apparatus comprising:

a first RAID controller blade configured to fit in the processor blade enclosure;

at least first and second processor blades in communication with the first RAID controller blade and configured to fit in the processor blade enclosure; and at least one disk enclosure blade comprising a plurality of hard disk drives, wherein the disk enclosure blade is configured to fit in the processor blade enclosure and the hard disk drives of the at least one disk enclosure blade are in communication with the first RAID controller blade via a serial attached SCSI ("SAS") expander;

wherein the first RAID controller blade is configured to share access to the at least one disk enclosure blade between the at first and second processor blades.

2. The apparatus of claim 1, wherein the SAS expander is configured to facilitate automatic switching between communication between the first RAID controller blade and the at least one disk enclosure blade and communication between the first RAID controller blade and at least one other disk enclosure blade.

3. The apparatus of claim 2, wherein the SAS expander is located in a second processor blade enclosure.

4. The apparatus of claim 3, wherein the SAS expander communicates with the first RAID controller blade and the hard disk drives through a communication fabric in the processor blade enclosure and the second processor blade enclosure.

5. The apparatus of claim 1, wherein the at least first and second processor blades are capable of concurrently communicating with the first RAID controller through a communication fabric in the processor blade enclosure.

6. The apparatus of claim 1, further comprising a second RAID controller blade configured to fit in the processor blade enclosure and in communication with the at least first and second processor blades and with the hard disk drives in the disk enclosure blade.

7. The apparatus of claim 6, wherein the second RAID controller blade is redundant to the first RAID controller blade.

8. The apparatus of claim 1, wherein the first RAID controller blade and the at least one disk enclosure blade are connected in a daisy chain configuration.

9. The apparatus of claim 1, wherein the at least one disk enclosure blade comprises up to eight trays containing hard disk drives.

10. The apparatus of claim 9, wherein each tray comprises up to three hard disk drives.

11. The apparatus of claim 1, wherein the hard disk drives comprise small form factors hard disk drives.

12. The apparatus of claim 1, wherein the processor blade enclosure comprises additional slots for processor blades.

13. The apparatus of claim 1, wherein the RAID controller blade and hard disk drives are configurable for different RAID levels.

14. An apparatus to provide communication between a client and a redundant array of independent disks ("RAID") storage subsystem within a processor blade enclosure, the apparatus comprising:
  a data command module configured to communicate a data storage command from a client to at least first and second processor blades located in the processor blade enclosure;
  a data storage module configured to transmit data related to the data storage command to a first RAID controller blade, the first RAID controller blade configured to fit in the processor blade enclosure and to communicate with the at least first and second processor blades through a communication fabric in the processor blade enclosure; and
  a RAID module configured to store the data on a plurality of hard disk drives in a RAID configuration, the plurality of hard disk drives being in communication with the first RAID controller blade via a serial attached SCSI ("SAS") expander and located in at least one disk enclosure blade configured to fit in the processor blade enclosure;
  wherein the RAID module is configured to share access to the at least one disk enclosure blade between the at first and second processor blades.

15. The apparatus of claim 14, wherein the first RAID controller blade comprises a processor blade.

16. The apparatus of claim 14, wherein the SAS expander facilitates automatic switching between communication between the first RAID controller blade and the at least one disk enclosure blade and communication between the first RAID controller blade and another disk enclosure blade in the processor blade enclosure.

17. A system to provide a redundant array of inexpensive disks ("RAID") storage subsystem within a processor blade enclosure, the system comprising:
  at least first and second processor blades in the processor blade enclosure;
  a client in communication with the at least one of the processor blades through a computer network;
  a first RAID controller blade configured to fit in the processor blade enclosure, the first RAID controller blade in communication with the at least first and second processor blades through a communication fabric in the processor blade enclosure; and
  at least two disk enclosure blades each comprising a plurality of hard disk drives, wherein the disk enclosure blades are configured to fit in the processor blade enclosure and the hard disk drives are in communication with the first RAID controller blade via an expander.

18. The system of claim 17, wherein the expander facilitates automatic switching between communication between the first RAID controller blade and a first of the at least two disk enclosure blades and communication between the first RAID controller blade and a second of the at least two disk enclosure blades.

19. The system of claim 17, further comprising a second RAID controller blade configured to fit in the processor blade enclosure and in communication with the at least first and second processor blades and with the hard disk drives of the at least two disk enclosure blades.

20. The system of claim 17, wherein the first RAID controller blade and the at least two disk enclosure blades are connected in a daisy chain configuration.

21. The system of claim 17, wherein the RAID controller blade and hard disk drives are configurable for different RAID levels.

22. A computer program product comprising a computer readable medium having computer usable program code programmed to provide communication between a client and a redundant away of independent disks ("RAID") storage subsystem within a processor blade enclosure, the operations of the computer program product comprising:
  communicating a data storage command from a client to at least first and second processor blades located in the processor blade enclosure through a computer network;
  transmitting data related to the data storage command to a first RAID controller blade configured to fit in the processor blade enclosure and to communicate with the at least first and second processor blades through a communication fabric in the processor blade enclosure;
  storing the data as directed by the first RAID controller blade via a switch on a plurality of hard disk drives in a RAID configuration, wherein the plurality of hard disk drives is located in at least one disk enclosure blade configured to fit in the processor blade enclosure;
  sharing access to the at least one disk enclosure blade between the first and second processor blades via the first RAID controller blade.

23. The computer program product of claim 22, wherein the switch comprises a serial attached SCSI ("SAS") expander, and wherein the hard disk drives communicate with the first RAID controller blade through the SAS expander.

24. The computer program product of claim 22, further comprising a second RAID controller blade configured to fit in the processor blade enclosure and in communication with the at least first and second processor blades and with the hard disk drives.

25. The computer program product of claim 22, further comprising configuring the hard disk drives for a particular RAID level.

26. A method for providing communication between a client and a redundant array of independent disks ("RAID") storage subsystem within a processor blade enclosure, the method comprising:

communicating a data storage command from a client to at least first and second processor blades located in the processor blade enclosure through a computer network;

transmitting data related to the data storage command to a first RAID controller blade configured to fit in the processor blade enclosure and to communicate with the at least first and second processor blades through a communication fabric in the processor blade enclosure; and storing the data as directed by the first RAID controller blade via an expander on a plurality of hard disk drives in a RAID configuration, wherein the plurality of hard disk drives is located in at least first and second disk enclosure blades configured to fit in the processor blade enclosure.

27. The method of claim 26, further comprising a second RAID controller blade configured to fit in the processor blade enclosure and in communication with the at least first and second processor blades and with the hard disk drives.

28. A method for configuring a redundant away of inexpensive disks ("RAID") storage subsystem within a processor blade enclosure, the method comprising:

establishing communication between a first RAID controller blade configured to fit in the processor blade enclosure and at least first and second processor blades through a communication fabric in the processor blade enclosure;

configuring a plurality of hard disk drives in at least two disk enclosure blades for a RAID level, wherein the disk enclosure blades are configured to fit in the processor blade enclosure;

configuring the first RAID controller blade to simultaneously control the hard disk drives in the at least two disk enclosure blades via an expander; and sharing access to the at least two disk enclosure blades between the first and second processor blades via the first RAID controller blade.

29. The method of claim 28, further comprising establishing communication between the at least first and second processor blades and a client through a computer network.

30. The method of claim 28, further comprising configuring a second RAID controller blade configured to fit in the processor blade enclosure as a redundant RAID controller blade.

* * * * *